United States Patent

Huber

[11] Patent Number: 6,151,128
[45] Date of Patent: Nov. 21, 2000

[54] OPTICAL POSITION INDICATOR

[75] Inventor: Walter Huber, Traunstein, Germany

[73] Assignee: Johannes Heidenhain GmbH, Traunreut, Germany

[21] Appl. No.: 09/242,705

[22] PCT Filed: Sep. 23, 1997

[86] PCT No.: PCT/EP97/05211

§ 371 Date: Jun. 21, 1999

§ 102(e) Date: Jun. 21, 1999

[87] PCT Pub. No.: WO98/16802

PCT Pub. Date: Apr. 23, 1998

[30] Foreign Application Priority Data

Oct. 16, 1996 [DE] Germany .......................... 196 42 680

[51] Int. Cl.[7] .................................................. G01B 11/14
[52] U.S. Cl. .......................... 356/499; 356/356; 356/375
[58] Field of Search ..................... 356/375, 356

[56] References Cited

U.S. PATENT DOCUMENTS

| | | |
|---|---|---|
| 4,595,991 | 6/1986 | Spies . |
| 4,766,310 | 8/1988 | Michel . |
| 4,776,701 | 10/1988 | Pettigrew . |
| 5,283,434 | 2/1994 | Ishizuka et al. .......................... 250/237 |
| 5,430,374 | 7/1995 | Metz . |
| 5,553,390 | 9/1996 | Ernst et al. . |
| 5,574,559 | 11/1996 | Kaneda et al. ........................... 356/356 |
| 5,661,296 | 8/1997 | Ishizuka et al. . |
| 5,678,319 | 10/1997 | Huber ........................................ 33/707 |
| 5,689,336 | 11/1997 | Huber . |
| 5,726,445 | 3/1998 | Thaler et al. . |

FOREIGN PATENT DOCUMENTS

| | | |
|---|---|---|
| 0 163 362 | 12/1985 | European Pat. Off. . |
| 0 223 009 | 5/1987 | European Pat. Off. . |
| 0 651 232 | 5/1995 | European Pat. Off. . |
| 0 672 891 | 9/1995 | European Pat. Off. . |

*Primary Examiner*—Frank G. Font
*Assistant Examiner*—Phil Natividad
*Attorney, Agent, or Firm*—Brinks Hofer Gilson & Lione

[57] ABSTRACT

An optical position measuring system that has a scale graduation with a graduation period, TP, and connected with a first object that has a graduation and a scanning unit connected to a second object that moves relative to the first object, so that there is a displacement between the scale graduation and the scanning unit. The scanning unit includes a scanning plate with a first and second scanning fields that are arranged offset from each other in a measuring direction (x) by a distance, D. A first deflection element associated with the first scanning field and a second deflection element associated with the second scanning field, wherein the first and second deflection elements spatially separate the phase-shifted partial signals from the first and second scanning fields. First and second detector elements are placed downstream of the scanning plate and associated with the first scanning field. Third and fourth detector elements are placed downstream of the scanning plate and associated with the second scanning field. The first and second scanning fields are arranged on the scanning plate so that the offset distance $D=TP/2*(N+¼)$, wherein $N=0, 1, 2, \ldots$

31 Claims, 2 Drawing Sheets

OPTICAL POSITION INDICATOR

BACKGROUND OF THE INVENTION

1. Field of the Invention

The present invention relates to an optical position measuring system for detecting the relative position of two objects which are movable with respect to each other.

2. Description of Related Art

An optical position measuring system in accordance with the species is known from EP 0 223 009 B1 of Dr. Johannes Heidenhain GmbH and will be explained below by means of the schematic representations in FIGS. 1a to 1c. A scale graduation M in the position measuring system is scanned by a scanning unit A, which is arranged parallel with the above mentioned grating M and is displaceable in the x direction. In the process, signals, which have been modulated as a function of the displacement, are detected with the aid of the scanning unit A and are further processed by means of an evaluation unit, not represented.

Besides a scanning plate AP, the scanning unit A contains a optical condenser element K and a support plate T; the individual components of the scanning unit A and their functions will be described in detail in what follows. The scanning plate AP has at least two scanning fields AF1, AF2, which are displaced in respect to each other in the measuring direction x by a fraction of the graduation period TP, i.e. the scanning fields AF1 and AF2 are arranged offset from each other in the measuring direction x by the distance D; both the scanning fields AF1 and AF2 as well as the graduation M have only been indicated schematically. The scanning fields AF1, AF2 on the scanning plate AP are preferably designed as phase gratings, by means of which phase-shifted partial light beams of different orders of diffraction can be generated by each one of the two scanning fields AF1, AF2 by means of a ratio, different from 1:1, between the step width to the groove width. Two of the resultant orders of diffraction are used per scanning field AF1, AF2, preferably the +1st and the −1st orders of diffraction. Therefore a total of four partial signals results, which can be further processed. Here the grating parameters have been selected such that a phase shift of 90° results between the partial signals of the +1st and −1st order of diffraction. For reasons of clarity the representation of the light beam path is omitted.

The various partial light beams are detected via downstream-connected detector elements D11, D12, D21 and D22, which are arranged on the support plate T of the scanning unit A; here, FIG. 1b shows the relative arrangement of the various detector elements D11, D12, D21 and D22 in the detector plane, as well as the light source L arranged on the support plate T.

An optical condenser element K is moreover arranged between the support plate T and the scanning plate AP, which is used for the collimation of the light beams emitted from the light source L as well as for showing the partial light beams reflected in the direction of the detector elements D11, D12, D21 and D22. Therefore the support plate T with the detector elements D11, D12, D21 and D22 and the light source L is arranged in the focal plane of the optical condenser element K within the scanning unit A.

For detecting the four partial signals, it is necessary to separate them spatially. In this case the spatial separation of partial signals phase-shifted by 90° is already made possible by splitting the partial light beams of each scanning field AF1, AF2 into different order of diffraction, i.e. for detection, the +1st and −1st order of diffraction used of each scanning field AF1, AF2 are provided spatially separated. These are two partial signals, shifted by 90°, from the scanning field AF1, which are detected by the detector elements D11 and D12; the partial signals, also phase-shifted by 90°, generated via the scanning field AF2 are detected by two further detector elements D21, D22. In this case the splitting into different orders of diffraction takes place in the drawing plane of FIG. 1a. The partial signals from the two scanning fields AF1 and AF2 must still be spatially separated. To this end it is proposed in EP 0 223 009 to assign selectively acting means AE1 and AE2 to the scanning fields AF1 and AF2 arranged in an offset manner. A spatial splitting perpendicularly in respect to the drawing plane of the two pairs of partial signals originating in the scanning fields AF1 and AF2 is caused by means of this.

The spatial conditions become clear in particular in the representation in accordance with FIG. 1b, in which furthermore the phase relations between the individual partial signals have also been drawn. The two left detector elements D11 and D12 are used for detecting the partial light beams of the +1st and −1st order of diffraction resulting from the scanning field AF1, the partial light beams diffracted into the +1st and −1st order of the scanning field AF2 are detected via the two right detector elements D21 and D22.

The phase shift of 180° between the partial light beams resulting from the scanning fields AF1 and AF2 is caused by the mentioned mutual offset D of these scanning fields AF1 and AF2 in the measuring direction x. The corresponding offset D in this case is $D=TP/2*(N+½)$, wherein TP represents the graduation period of the scale graduation, and $N=0, 1, 2 \ldots$ applies. In order to generate the two desired output signals 0°, 90°, phase-shifted by 90°, for further processing from the four different partial signals in the end, it is now proposed in EP 0 223 009 to wire the detector elements D11, D12, D21, D22 in the manner represented in FIG. 1c. This means that for forming the 0° signal, the two detector elements D11 and D21 with partial signals phase-shifted by 180° are wired anti-parallel in relation to each other, while for forming the 90° signal, the two detector elements D12 and D22 with opposite-phase partial signals applied to them, are also wired anti-parallel in relation to each other. Accordingly, respectively those detector elements D11, D12, D21, D22 are wired anti-parallel in relation to each other, to which opposite-phase signals are applied, wherein the opposite-phase partial signals always come from different scanning fields AF1, AF2.

In summation it should be emphasized that the 90° phase shift between the partial signals of the +1st and −1st order of diffraction is set by the selection of the grating parameters of the scanning fields AF1, AF2, while the respective opposite-phases partial signal with a 180° phase shift in relation to this comes from the respectively other scanning field, which is arranged offset by the distance D in relation to the first one in the measuring direction x.

The position measuring system proposed in EP 0233 009, however, has certain disadvantages. For example, the counter-clock signal formation takes place in that partial signals from different scanning fields AF1, AF2 are switched anti-parallel. In case of local degradation of the scanning fields AF1, AF2, the result of this are so-called scanning ratio errors, because the amplitudes of the anti-parallel switched counter-phase partial signals from the different scanning fields AF1, AF2 are not identical. Such errors result, inter alia, not only in the interferential measuring systems described in EP 0 223 009.

Based on the outlay of the phase shift of the interference signals of the +1st and −1st order of diffraction from the two scanning fields AF1, AF2 by 90°, the degree of modulation of these signals is greatly diminished in contrast to a dimensioning of the phase shift by 120°. An optimal modulation of the interference signals is to be expected in an interferential three grating sensor with an outlay of the grating parameters of the scanning fields with a phase shift of 120° between the orders of diffraction employed. This has been achieved, for example, in a position measuring system which has been described in EP 0 163 362.

Thus, clearly higher demands are made on the grating production with a phase layout of 90° between the interference signals of the +1st and −1st order of diffraction. If the same production tolerances during the grating production as in the case of a 120° phase shift would be allowed in the phase layout to 90° between the interference signals of the +1st and −1st order of diffraction, considerably higher fluctuation in the degree of modulation and phase angle of the partial signals would have to be expected.

SUMMARY OF THE INVENTION

It is therefore the object and advantage of the invention to create a high-resolution optical position measuring system, in particular an interferential three grating position measuring system, which produces output signals phase-shifted by 90° for further processing, and wherein local soiling of scanning fields and/or the scale graduation have the lowest possible effect on the resulting measurement accuracy. It is furthermore intended that the tolerance requirements for the production of the graduated structures on the scanning fields be as low as possible.

This object and advantage are is attained by an optical position measuring system having the features of two aspects of the present invention, where each aspect includes an optical position measuring system that has a scale graduation with a graduation period, TP, and connected with a first object that has a graduation and a scanning unit connected to a second object that moves relative to the first object, so that there is a displacement between the scale graduation and the scanning unit. The scanning unit includes a scanning plate with a first scanning field and a second scanning field that are arranged offset from each other in a measuring direction (x) by a defined distance, D, so that definitely phase-shifted partial signals, which are modulated as a function of the displacement can be associated with the first and second scanning fields. A first deflection element associated with the first scanning field and a second deflection element associated with the second scanning field, wherein the first and second deflection elements spatially separate the phase-shifted partial signals from the first and second scanning fields. First and second detector elements are placed downstream of the scanning plate and associated with the first scanning field, wherein the first detector element and the second detector element detect the spatially separated phase-shifted partial signals in different spatial directions. Third and fourth detector elements are placed downstream of the scanning plate and associated with the second scanning field, wherein the third detector element and the fourth detector element detect the spatially separated phase-shifted partial signals in different spatial directions. The first, second, third and fourth detector elements are wired together so that two output signals, which are phase-shifted by 90° relative to one another, are generated at an output side of the optical position measuring system. One aspect of the invention has the first and second scanning fields are arranged on the scanning plate so that the offset distance D=TP/2*(N+¼), wherein N=0, 1, 2, . . . , while a second aspect of the invention has the first and second detector elements wired anti-parallel to one another and the third and fourth detector elements wired anti-parallel to one another so that the resulting output signals of the first and second scanning fields have a phase-shift of 90° with respect to each other.

The steps in accordance with the invention now assure scanning, wherein the partial signals employed for forming the output signals phase-shifted by 90° respectively are derived from the same scanning field, while in the solution in accordance with the prior art discussed, partial signals from different scanning fields were used for this. This has as a result that, in case of local degradation of a scanning field, for example, only so-called amplitude errors are created in the position measuring system in accordance with the invention. In this case an error resulting from the different amplitudes of the two output signals phase-shifted by 90° would be identified as an amplitude error.

As a whole, a smaller division error during the subsequent interpolation results with the optical position measuring system in accordance with the invention in comparison with the known solution in accordance with the mentioned prior art.

Moreover, with equal tolerance requirements made of the grating production, it is possible to assume with the position measuring system in accordance with the invention that both the desired phase angles between the different partial signals as well as their amplitudes are considerably closer to the desired control variables. This improved meeting of desired requirements can be attributed to the fact that in case of interferential three grating sensors the maximum modulation in the partial signals of the +1st and −1st order of diffraction is just reached with the phase layout of 120°, as it is provided in the position measuring system in accordance with the invention.

Furthermore, compatibility of an interferential measuring system, for example designed as a three grating sensor in accordance with EP 0 163 362, with conventional evaluation units, which require two signals on the input side which are phase-shifted by 90°, is assured in a simple manner.

Further objects and advantages as well as details of the position measuring system in accordance with the invention ensue from the following description of an exemplary embodiment by means of the attached drawing figures.

Shown here are in:

DESCRIPTION OF THE PREFERRED EMBODIMENTS

Figure 1A:
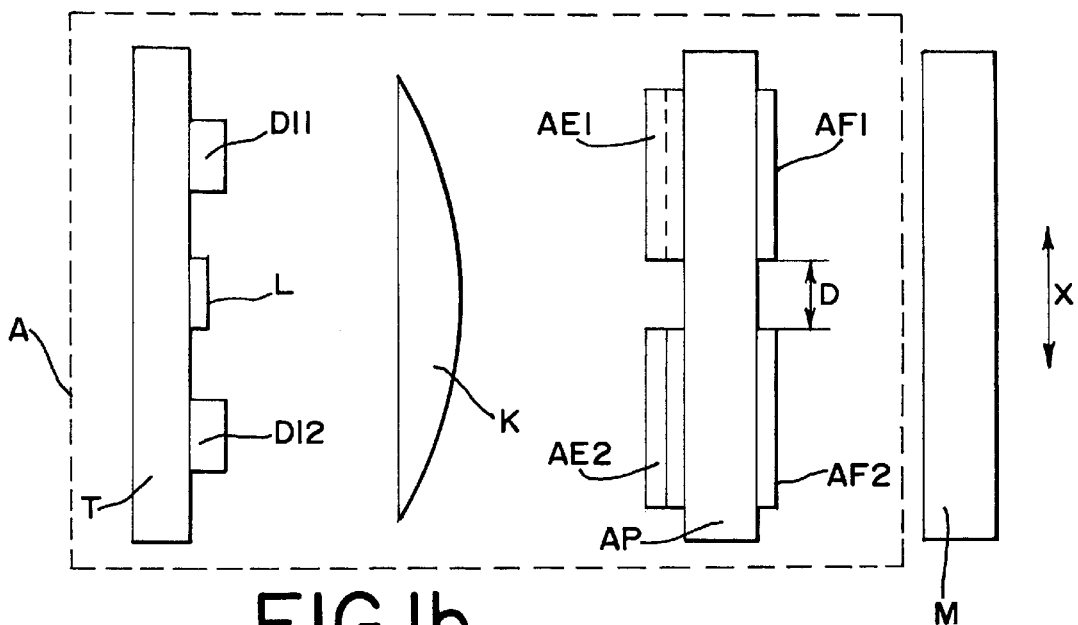
FIGS. 1a to 1c schematically show a prior art optical position measuring system.
Figure 1B:
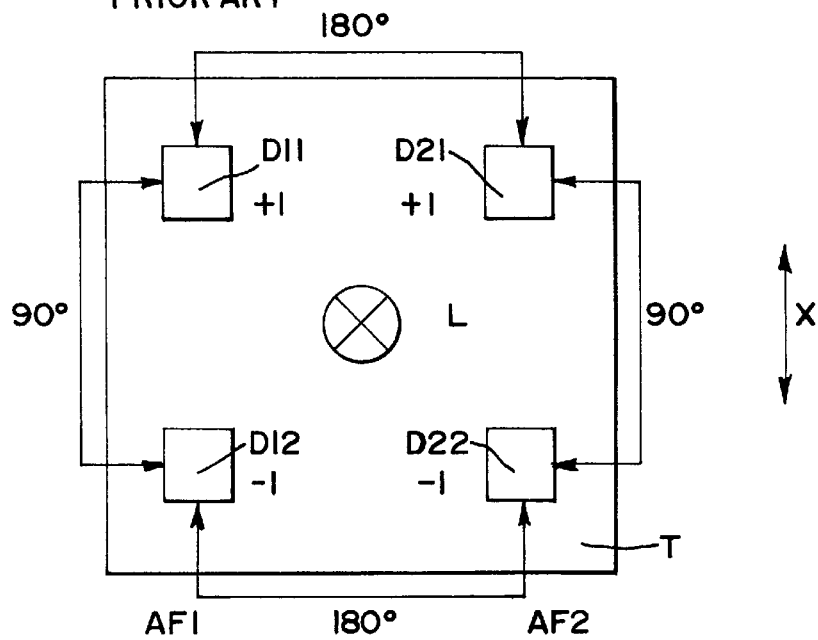
Figure 1C:
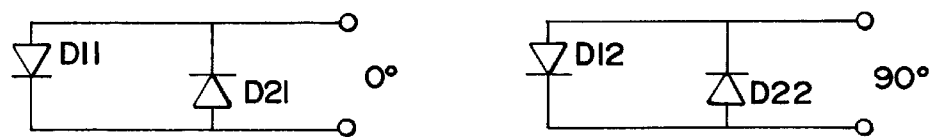
Figure 2A:
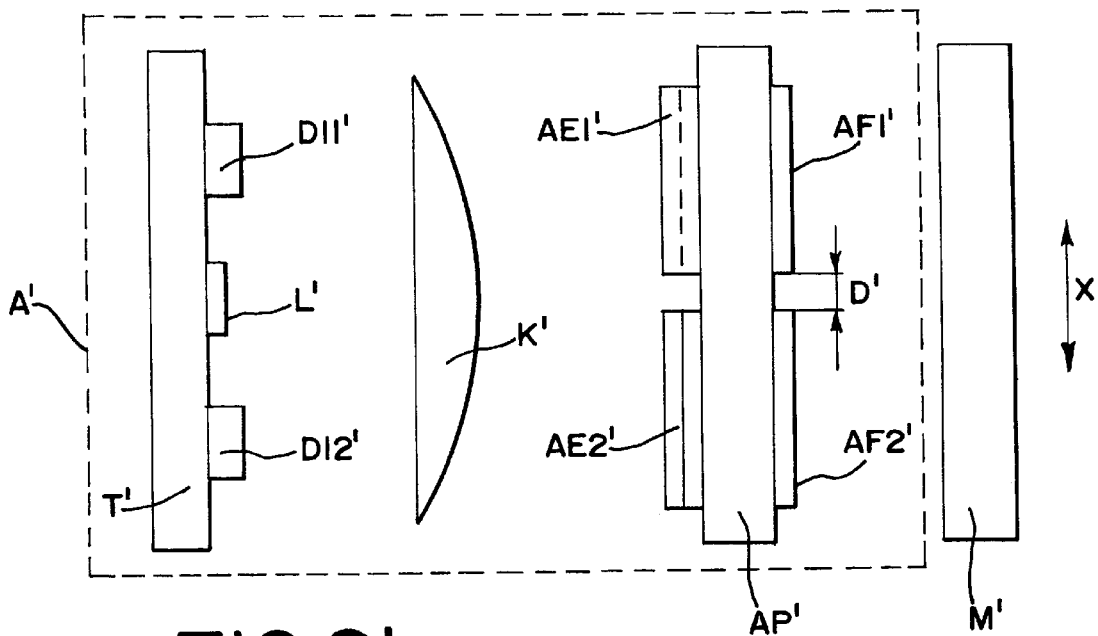
FIGS. 2a to 2c, respectively a schematic partial view of the optical position measuring system in accordance with the invention.

The optical position measuring system in accordance with the invention will be explained in what follows by means of FIGS. 2a to 2c. These are schematic partial views in which, analogously with the explanation of the prior art by means of FIGS. 1a to 1c, the representation of the individual beam paths, or respectively partial beam paths, are omitted. Here, FIG. 2a shows a lateral view of the optical position measuring system in accordance with the invention, FIG. 2b the distribution of the detector elements in the detector plane, or respectively the focal plane of the condenser, including the phase relationships between the individual partial signals which act on different detector elements; FIG. 2c finally shows the wiring of the detector elements for generating the output signals phase-shifted by 90°.

The position measuring system in accordance with the invention for detecting the relative position of two objects which can be moved in relation to each other, comprises a scale graduation M' as well as a scanning unit A'. The light beams emitted by a light source L' are collimated in a optical condenser element K' and initially pass the scanning plate AP' a first time and are diffracted. The diffracted partial light beams impinge upon the scale graduation M', are reflected again while being diffracted and pass the scanning plate AP' a second time. The partial light beams, which were deflected in the same spatial direction and arrive at the same place during the second passage of the scanning plate AP', interfere in the plane of the grating graduation of the scanning plate AP' and are detected by means of downstream located detector elements D11', D12',D21', D22' and are further processed. As already indicated above, the support plate T' with the light source L' and the detector elements D11', D12', D21', D22' is arranged in the focal plane of the optical condenser element K'.

The scale graduation M' and the scanning unit A' are arranged, displaceable in the measuring direction in respect to each other, which is identified as the x direction in the representation, and are connected with the objects, which are movable in respect to each other. Interference signals, which are modulated as a function of the displacement, result in case of a relative displacement and are detected by means of the detector elements D11', D12', D21', D22'. The movably arranged objects can be, for example, the workpiece and the tool of a conventional machine tool. However, besides that, a multitude of other employment possibilities are conceivable for the optical measuring system in accordance with the present invention.

The embodiment represented in FIG. 2a shows an incident light measuring system, i.e. the scale graduation M' has a reflecting graduation structure which, however, is not represented in detail. Besides this, it is also possible in principle to design the position measuring system in accordance with the invention as a transmitted light measuring system with a transparent graduation structure. In the same way it is of course also possible in accordance with the invention to provide an angle measuring system alternatively to the represented length measuring system.

Two scanning fields AF1' and AF2', which are arranged spatially separated in the measuring direction x, are arranged on the scanning plate AP'. The two scanning fields AF1' and AF2' are designed in a manner known per se in the form of transmitted light phase gratings with a defined graduation period TP'. The scanning fields AF1' and AF2' are arranged, offset from each other in the measuring direction x by a defined amount D', on the scanning plate AP'. In accordance with the invention it is now provided to arrange the scanning fields AF1' and AF2' offset from each other by a distance D', wherein the following applies to D':

$$D=TP'/2*(N+¼),$$

wherein TP' is the graduation period of the scanning grating and N=0, 1, 2, 3, . . .

Moreover, optical deflection elements AE1' and AE2' are definitely assigned to the two scanning fields AF1' and AF2' on the scanning plate AP', which, as already described above, are used for directional separation, or respectively spatial separation of the partial light beams, or respectively partial signals, provided by the scanning fields AF1' and AF2'. In the exemplary embodiment represented, the required optical deflection elements AE1' and AE2' are designed as wedge-shaped prisms, wherein the two prisms are arranged with different orientation on the side of the scanning plate AP' facing the support plate T' with the detector elements D11', D12', D21', D22' and the light source L'.

Alternatively to the exemplary embodiment represented, the scanning fields AF1' and AF2' can of course also be arranged on the other side of the scanning plate AP', i.e. directly under the deflection elements AE1' and AE2'. It is furthermore possible to design the optical deflection elements also as diffraction grating structures with a respectively definitely adjustable deflection effect.

For the further spatial separation of the four partial signals to be evaluated, the scanning gratings of the two scanning fields AF1' and AF2', are of such size that the respective light beams impinging on them are deflected, inter alia, into the +1st and −1st orders of diffraction; in this case the light beams deflected into these spatial directions are used for further evaluation. The partial light beams, which are here deflected in these two orders of diffraction, have a phase shift of 120° in respect to each other. The grating parameters of the scanning gratings are suitably selected for assuring this.

It has been provided to arrange four separate detector elements D11', D12', D21' and D22' and a light source L' on the detector side of a support plate T'. The exact arrangement of the individual detector elements D11', D12', D21', D22' is represented in FIG. 2b. In the representation of FIG. 2b, the provided light source L' can also be seen in the center of the support plate T'. Alternatively to the embodiment represented, in place of the light source, the support plate can also have a suitable cutout, through which the light beams of the separately arranged light source fall on the optical condenser element, the scanning plate and the scale graduation.

Figure 2B:
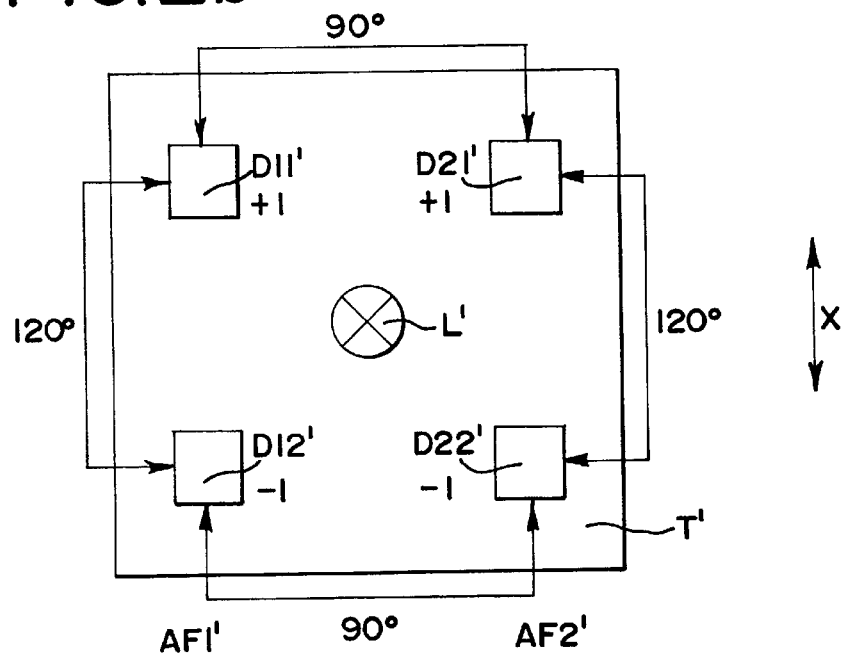
Figure 2C:
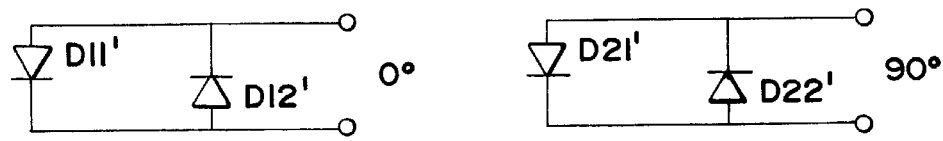

If the grating structure of the two scanning fields AF1' and AF2' has the same size as the known three grating sensor in accordance with EP 0 163 362, so that, as previously mentioned, the +1st and −1st orders of diffraction have a phase shift of 120° in respect to each other, then the phase relations between the individual partial signals represented in FIG. 2b result in connection with the embodiment of the optical position measuring system in accordance with the invention, represented in FIGS. 2a to 2c. The phase relations between the different detector elements D11', D12', D21', D22', which are associated with the different partial signals, have been drawn in FIG. 2b.

The two left detector elements D11' and D12' here register the partial signals coming from the scanning field AF1' which have, as previously explained, a phase shift of 120° from each other. While the detector D11' detects the +1st order of diffraction, the detector element D12', detects the −11st order of diffraction. Analogously with this, the +1st order of diffraction from the scanning field AF2' is detected by means of the detector element D21', while the detector element D22' registers the −1st order of diffraction from this scanning field, i.e. the two right detector elements D21' and D22' detect the partial signals from the scanning field AF2'. Here, too, the phase shift between the +1st and −1st orders of diffraction is 120°, based on the appropriately selected grating parameters.

Because of the above mentioned dimension of the offset D1 between the two scanning fields AF1' and AF2' on the scanning plate AP', a phase shift of 90° results between the corresponding partial signals from both scanning fields AF1' and AF2', which has also been drawn in FIG. 2b.

The wiring of the individual detector elements in the optical measuring system in accordance with the invention now takes place in the manner represented in FIG. 2c in order to obtain the desired output signals, phase-shifted by 90°, in the end. Thus, for forming the output signal, hereinafter called the 0° signal, the detector elements D11' and D12' are wired anti-parallel with each other. Analogously with this, the required 90° signal results from the anti-parallel wiring of the detector elements D21' and D22' as the desired second output signal.

It can now be clearly seen that the partial signals, which have respectively been used for generating the two desired output signals 0° and 99°, come from a common scanning field AF1' or AF2'. To form the respective zero-symmetrical output signals 0°, 90°, the detector elements D11', D12', D21', D22', which are respectively assigned to a scanning field AF1', AF2', are wired anti-parallel in the manner shown.

A stable scanning condition results, i.e. a constant relation between the amplitudes of the partial signal employed for forming the 0° and 90° signals. If, for example, one of the two scanning fields AF1', AF2' is locally degraded, this has merely an effect on the two partial signals from this one scanning field. However, the effect affects the two partial signals, which are used for generating the output signals associated with this scanning field, in the same way. Only amplitude errors between the two output signals, phase-shifted by 90°, arise as errors, i.e. the amplitude of the output signal generated from the soiled scanning field is less than the amplitude of the output signal from the other scanning field, which is not soiled.

Moreover, it is possible for further minimizing such amplitude errors to use more than only the two represented scanning fields on a scanning plate. For example, it is possible here to provide the arrangement of the scanning fields AF1', AF21' represented in the exemplary embodiment several times in succession in the measuring direction x. A phase-correct superimposition of the partial signals from the respective scanning fields AF1', or respectively AP2', results in this case.

The output signals, phase-shifted by 90°, of the optical position measuring system in accordance with the invention provided, at the end can be used in a known manner by downstream-connected, conventional evaluation units for the exact position determination, including a directional discrimination.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed is:

1. An optical position measuring system for detecting the relative position of a first object and a second object which are movable in respect to each other, comprising:
    a scale graduation with a graduation period, TP, and connected with a first object;
    a scanning unit connected to a second object that moves relative to the first object, so that there is a displacement between the scale graduation and the scanning unit, wherein the scanning unit comprises a scanning plate that comprises a first scanning field and a second scanning field that are arranged offset from each other in a measuring direction (x) by a defined distance, D, so that definitely phase-shifted partial signals, which are modulated as a function of the displacement can be associated with the first and second scanning fields;
    a first deflection element associated with the first scanning field;
    a second deflection element associated with the second scanning field, wherein the first and second deflection elements spatially separate the phase-shifted partial signals from the first and second scanning fields;
    a first detector element placed downstream of the scanning plate and associated with the first scanning field;
    a second detector element placed downstream of the scanning plate and associated with the first scanning field, wherein the first detector element and the second detector element detect the spatially separated phase-shifted partial signals in different spatial directions;
    a third detector element placed downstream of the scanning plate and associated with the second scanning field;
    a fourth detector element placed downstream of the scanning plate and associated with the second scanning field, wherein the third detector element and the fourth detector element detect the spatially separated phase-shifted partial signals in different spatial directions; and
    wherein the first, second, third and fourth detector elements are wired together so that two output signals, which are phase-shifted by 90° relative to one another, are generated at an output side of the optical position measuring system; and
    wherein the first and second scanning fields are arranged on the scanning plate so that the offset distance $D = TP/2 \cdot (N + \frac{1}{4})$, wherein $N = 0, 1, 2, \ldots$.

2. The optical position measuring system of claim 1, wherein for each phase shifted partial signal from the first scanning field there is at least one partial signal from the second scanning field that is phase-shifted by 90° relative thereto.

3. The optical position measuring system of claim 1, wherein the first detector element is wired anti-parallel with the second detector element so that a resulting output signal can be associated with the first scanning field and the resulting output signals of the first and second scanning fields have a phase- shift of 90° with respect to each other.

4. The optical position measuring system of claim 2, wherein the first detector element is wired anti-parallel with the second detector element so that a resulting output signal can be associated with the first scanning field and the resulting output signals of the first and second scanning fields have a phase- shift of 90° with respect to each other.

5. The optical position measuring system of claim 3, wherein the third detector element is wired anti-parallel with the fourth detector element so that a resulting output signal can be associated with the second scanning field and the resulting output signals of the first and second scanning fields have a phase- shift of 90° with respect to each other.

6. The optical position measuring system of claim 1, wherein the first and second detector elements are arranged in a common plane.

7. The optical position measuring system of claim 1, wherein the first, second and third detector elements are arranged in a common plane.

8. The optical position measuring system of claim 1, wherein the first, second, third and fourth detector elements are arranged in a common plane.

9. The optical position measuring system of claim 1, comprising a light source arranged on a support plate.

10. The optical position measuring system of claim 9, wherein the first and second detector elements are arranged on the support plate.

11. The optical position measuring system of claim 6, comprising a light source arranged on a support plate.

12. The optical position measuring system of claim 11, wherein the first and second detector elements are arranged on the support plate.

13. The optical position measuring system of claim 1, wherein the first scanning field comprises a first graduation and the second scanning field comprises a second graduation, wherein the first and second graduations are optimized in respect to the +1st and −1st order of diffraction, so that a phase shift of 120° exists between the partial signals of these orders of diffraction.

14. The optical position measuring system of claim 1, wherein the first deflection element comprises a prism.

15. The optical position measuring system of claim 1, wherein the position measuring system is designed as a linear measuring system.

16. The optical position measuring system of claim 1, wherein the position measuring system is designed as an angle measuring system.

17. An optical position measuring system for detecting the relative position of a first object and a second object which are movable in respect to each other, comprising:
 a scale graduation with a graduation period, TP, and connected with a first object;
 a scanning unit connected to a second object that moves relative to the first object, so that there is a displacement between the scale graduation and the scanning unit, wherein the scanning unit comprises a scanning plate that comprises a first scanning field and a second scanning field that are arranged offset from each other in a measuring direction (x) by a defined distance, D, so that definitely phase-shifted partial signals, which are modulated as a function of the displacement can be associated with the first and second scanning fields;
 a first deflection element associated with the first scanning field;
 a second deflection element associated with the second scanning field, wherein the first and second deflection elements spatially separate the phase-shifted partial signals from the first and second scanning fields:
 a first detector element placed downstream of the scanning plate and associated with the first scanning field;
 a second detector element placed downstream of the scanning plate and associated with the first scanning field, wherein the first detector element and the second detector element detect the spatially separated phase-shifted partial signals in different spatial directions;
 a third detector element placed downstream of the scanning plate and associated with the second scanning field;
 a fourth detector element placed downstream of the scanning plate and associated with the second scanning field, wherein the third detector element and the fourth detector element detect the spatially separated phase-shifted partial signals in different spatial directions; and
 wherein the first, second, third and fourth detector elements are wired together so that two output signals, which are phase-shifted by 90° relative to one another, are generated at an output side of the optical position measuring system; and
 wherein the first and second scanning fields are arranged on the scanning plate so that the offset distance D=TP/2*(N+¼) wherein N=0, 1, 2, . . . ; and
 wherein the first and second scanning fields are optimized in respect to the +1st and −1st order of diffraction, so that a phase shift of 120° exists between the partial signals of these orders of diffraction.

18. An optical position measuring system for detecting the relative position of a first object and a second object which are movable in respect to each other, comprising:
 a scale graduation with a graduation period, TP, and connected with a first object;
 a scanning unit connected to a second object that moves relative to the first object, so that there is a displacement between the scale graduation and the scanning unit, wherein the scanning unit comprises a scanning plate that comprises a first scanning field and a second scanning field that are arranged offset from each other in a measuring direction (x) by a defined distance, D so that definitely phase-shifted partial signals which are modulated as a function of the displacement can be associated with the first and second scanning fields;
 a first deflection element associated with the first scanning field;
 a second deflection element associated with the second scanning field, wherein the first and second deflection elements spatially separate the phase-shifted partial signals from the first and second scanning fields;
 a first detector element placed downstream of the scanning plate and associated with the first scanning field;
 a second detector element placed downstream of the scanning plate and associated with the first scanning field, wherein the first detector element and the second detector element detect the spatially separated phase-shifted partial signals in different spatial directions;
 a third detector element placed downstream of the scanning plate and associated with the second scanning field;
 a fourth detector element placed downstream of the scanning plate and associated with the second scanning field, wherein the third detector element and the fourth detector element detect the spatially separated phase-shifted partial signals in different spatial directions; and
 wherein the first second, third and fourth detector elements are wired together so that two output signals, which are phase-shifted by 90° relative to one another, are generated at an output side of the optical position measuring system; and
 wherein the first and second scanning fields are arranged on the scanning plate so that the offset distance D=TP/2*(N+¼), wherein N=0, 1, 2, . . .; and
 wherein the first deflection element comprises a first prism; and
 wherein the second deflection element comprises a second prism.

19. An optical position measuring system for detecting the relative position of a first object and a second object which are movable in respect to each other, comprising:
 a scale graduation with a graduation period, TP, and connected with a first object;
 a scanning unit connected to a second object that moves relative to the first object, so that there is a displacement between the scale graduation and the scanning unit wherein the scanning unit comprises a scanning plate that comprises a first scanning field and a second scanning field that are arranged offset from each other in a measuring direction (x) by a defined distance, D, so that definitely phase-shifted partial signals, which are modulated as a function of the displacement can be associated with the first and second scanning fields;

a first deflection element associated with the first scanning field;

a second deflection element associated with the second scanning field, wherein the first and second deflection elements spatially separate the phase-shifted partial signals from the first and second scanning fields;

a first detector element placed downstream of the scanning plate and associated with the first scanning field;

a second detector element placed downstream of the scanning plate and associated with the first scanning field, wherein the first detector element and the second detector element detect the spatially separated phase-shifted partial signals in different spatial directions, and wherein the first detector element is wired anti-parallel with the second detector so that a resulting output signal associated with the first scanning field is generated, and a third detector element placed downstream of the scanning plate and associated with the second scanning field;

a fourth detector element placed downstream of the scanning plate and associated with the second scanning field, wherein the third detector element and the fourth detector element detect the spatially separated phase-shifted partial signals in different spatial directions, and wherein the third detector element is wired anti-parallel with the fourth detector so that a resulting output signal associated with the second scanning field is generated; and wherein the resulting output signals of the first and second scanning fields have a phase- shift of 90° with respect to each other and are generated at an output side of the optical position measuring system.

20. The optical position measuring system of claim 19, wherein for each phase shifted partial signal from the first scanning field there is at least one partial signal from the second scanning field that is phase-shifted by 90° relative thereto.

21. The optical position measuring system of claim 19, wherein the first and second detector elements are arranged in a common plane.

22. The optical position measuring system of claim 19, wherein the first, second and third detector elements are arranged in a common plane.

23. The optical position measuring system of claim 19, wherein the first, second, third and fourth detector elements are arranged in a common plane.

24. The optical position measuring system of claim 19, comprising a light source arranged on a support plate.

25. The optical position measuring system of claim 24, wherein the first and second detector elements are arranged on the support plate.

26. The optical position measuring system of claim 19, wherein the first scanning field comprises a first graduation and the second scanning field comprises a second graduation, wherein the first and second graduations are optimized in respect to the +1st and −1st order of diffraction, so that a phase shift of 120° exists between the partial signals of these orders of diffraction.

27. The optical position measuring system of claim 19, wherein the first deflection element comprises a prism.

28. The optical position measuring system of claim 19, wherein the position measuring system is designed as a linear measuring system.

29. The optical position measuring system of claim 19, wherein the position measuring system is designed as an angle measuring system.

30. An optical position measuring system for detecting the relative position of a first object and a second object which are movable in respect to each other, comprising:

a scale graduation with a graduation period, TP, and connected with a first object;

a scanning unit connected to a second object that moves relative to the first object, so that there is a displacement between the scale graduation and the scanning unit wherein the scanning unit comprises a scanning plate that comprises a first scanning field and a second scanning field that are arranged offset from each other in a measuring direction (x) by a defined distance, D, so that definitely phase-shifted partial signals, which are modulated as a function of the displacement can be associated with the first and second scanning fields;

a first deflection element associated with the first scanning, field;

a second deflection element associated with the second scanning field, wherein the first and second deflection elements spatially separate the phase-shifted partial signals from the first and second scanning fields;

a first detector element placed downstream of the scanning plate and associated with the first scanning field;

a second detector element placed downstream of the scanning plate and associated with the first scanning field, wherein the first detector element and the second detector element detect the spatially separated phase-shifted partial signals in different spatial directions, and wherein the first detector element is wired anti-parallel with the second detector so that a resulting output signal associated with the first scanning field is generated, and a third detector element placed downstream of the scanning plate and associated with the second scanning field;

a fourth detector element placed downstream of the scanning plate and associated with the second scanning field, wherein the third detector element and the fourth detector element detect the spatially separated phase-shifted partial signals in different spatial directions, and wherein the third detector element is wired anti-parallel with the fourth detector so that a resulting output signal associated with the second scanning field is generated; and wherein the resulting output signals of the first and second scanning fields have a phase- shift of 90° with respect to each other and are generated at an output side of the optical position measuring system; and wherein the first and second scanning fields are optimized in respect to the +1st and −1st order of diffraction, so that a phase shift of 120° exists between the partial signals of these orders of diffraction.

31. An optical position measuring system for detecting the relative position of a first object and a second object which are movable in respect to each other comprising:

a scale graduation with a graduation period, TP, and connected with a first object;

a scanning unit connected to a second object that moves relative to the first object, so that there is a displacement between the scale graduation and the scanning unit wherein the scanning unit comprises a scanning plate that comprises a first scanning field and a second scanning field that are arranged offset from each other in a measuring direction (x) by a defined distance, D, so that definitely phase-shifted partial signals which are modulated as a function of the displacement can be associated with the first and second scanning fields;

a first deflection element associated with the first scanning field;

a second deflection element associated with the second scanning field, wherein the first and second deflection elements spatialy separate the phase-shifted partial signals from the first and second scanning fields;

a first detector element placed downstream of the scanning plate and associated with the first scanning field;

a second detector element placed downstream of the scanning plate and associated with the first scanning field, wherein the first detector element and the second detector element detect the spatially separated phase-shifted partial signals in different spatial directions, and wherein the first detector element is wired anti-parallel with the second detector so that a resulting output signal associated with the first scanning field is generated, and a third detector element placed downstream of the scanning plate and associated with the second scanning field;

a fourth detector element placed downstream of the scanning plate and associated with the second scanning field, wherein the third detector element and the fourth detector element detect the spatially separated phase-shifted partial signals in different spatial directions, and wherein the third detector element is wired anti-parallel with the fourth detector so that a resulting output signal associated with the second scanning field is generated; and wherein the resulting output signals of the first and second scanning fields have a phase- shift of 90°0 with respect to each other and are generated at an output side of the optical position measuring system; and wherein the first deflection element comprises a first prism; and wherein the second deflection element comprises a second prism.

* * * * *

UNITED STATES PATENT AND TRADEMARK OFFICE
CERTIFICATE OF CORRECTION

PATENT NO.    : 6,151,128
DATED         : November 21, 2000
INVENTOR(S)   : Walter Huber It is certified that error appears in the above-identified patent and that said Letters Patent is hereby corrected as shown below:

Claim 17,
Line 21, change "fields:" to -- fields; --.
Line 44, change "(N+¼)" to -- (N+¼), --.

Claim 18,
Line 12, change "D so" to -- D, so --.
Line 37, change "first second," to -- first, second, --.

Claim 31,
Line 46, change "90°0 with" to -- 90° with --.

Signed and Sealed this

Eleventh Day of December, 2001

Attest:

NICHOLAS P. GODICI
*Attesting Officer*     *Acting Director of the United States Patent and Trademark Office*